United States Patent
Andre et al.

(10) Patent No.: US 8,109,468 B2
(45) Date of Patent: Feb. 7, 2012

(54) NACELLE FOR AIRCRAFT COMPRISING MEANS OF REVERSING THRUST AND AIRCRAFT COMPRISING AT LEAST ONE SUCH NACELLE

(75) Inventors: Robert Andre, Lacroix Falgarde (FR); Benoit Letay, Bouloc (FR); Benjamin Saget, Toulouse (FR); Eric Inghelbrecht, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 393 days.

(21) Appl. No.: 12/491,746

(22) Filed: Jun. 25, 2009

(65) Prior Publication Data

US 2009/0321561 A1 Dec. 31, 2009

(30) Foreign Application Priority Data

Jun. 26, 2008 (FR) ..................... 08 54270

(51) Int. Cl.
*F02K 1/54* (2006.01)
*F02K 3/02* (2006.01)
(52) U.S. Cl. ............... 244/110 B; 60/226.2; 239/265.29
(58) Field of Classification Search .............. 244/110 B, 244/129.4; 60/226.1–226.3, 262; 239/265.29
See application file for complete search history.

(56) References Cited

U.S. PATENT DOCUMENTS

| 3,036,431 A | | 5/1962 | Alexander | |
| 3,608,314 A | * | 9/1971 | Colley | 60/226.2 |
| 3,665,709 A | | 5/1972 | Medawar et al. | |
| 4,564,160 A | * | 1/1986 | Vermilye | 244/110 B |
| 6,065,285 A | * | 5/2000 | Gonidec et al. | 60/226.2 |
| 2007/0234707 A1 | * | 10/2007 | Beardsley | 60/226.2 |

FOREIGN PATENT DOCUMENTS

| EP | 1 843 031 A1 | 10/2007 |
| FR | 2 887 225 A1 | 12/2006 |
| GB | 1 276 265 | 6/1972 |
| WO | WO 2008/145725 A1 | 12/2008 |

* cited by examiner

Primary Examiner — Joshua Michener
Assistant Examiner — Jamie S Stehle
(74) Attorney, Agent, or Firm — Oblon, Spivak, McClelland, Maier & Neustadt, L.L.P.

(57) ABSTRACT

Aircraft nacelle including a cowling and an engine, the cowling including a fixed portion and a mobile portion able to slide in order to define a radial opening with the mobile portion, a thrust reverser system including a plurality of flaps intended to be deployed in order to seal at least partially an annular channel surrounding the engine, the mobile portion of the cowling including an annular housing extending longitudinally in order to receive the flaps in rest position. Each flap is linked to the fixed portion by a pivot joint and is linked to the mobile portion by a sliding-pivot joint, in such a way that a sliding of the mobile portion in separating from the fixed portion provokes a rotation of each flap around the axis of rotation of the joint with the fixed portion.

14 Claims, 8 Drawing Sheets

NACELLE FOR AIRCRAFT COMPRISING MEANS OF REVERSING THRUST AND AIRCRAFT COMPRISING AT LEAST ONE SUCH NACELLE

TECHNICAL FIELD AND PRIOR ART

This invention relates to an aircraft nacelle, and more particularly to a device provided on an aircraft nacelle in order to reduce, cancel or reverse the thrust produced by a propulsion unit.

An aircraft propulsion unit comprises an engine with on the one hand, a fan comprising a rotor provided with blades and a stator provided with vanes, and on the other hand, a primary duct wherein are arranged according to the direction of air flow, stages of compressors, a combustion chamber and stages of turbines. The engine is arranged in a nacelle which comprises upstream of the fan an air inlet and downstream of the stator of the fan a secondary duct.

Generally, the secondary duct has substantially the form of an annular channel surrounding the primary duct. The primary duct is lined to the wing by a longitudinal pylon serving to fix the propulsion unit to the wing, crossing the annular channel, and linked to an upper portion of the primary duct. In another configuration, the primary duct can be linked to the fuselage by a longitudinal structure.

In order to reduce the sound nuisance, certain portions of the surfaces of the secondary duct include coatings for the acoustic surface treatment.

A propulsion unit generally comprises a thrust reversing device making it possible to deviate at least one portion of the flow in order to reduce, cancel or reverse the thrust produced by said propulsion unit using one or several mobile flaps able to interpose themselves in the secondary flow in order to deviate it.

It is known, from FR 2 887 225, a nacelle provided with a thrust reverser, the nacelle comprising a front portion and a rear portion separated by an annular radial opening, with the front and rear portions being formed by an internal cowling and an external cowling, and interior and exterior flaps being provided at the level of the radial opening, the internal flaps being mobile towards the interior of the secondary duct in order to lock or at least reduce the secondary flow and the external pivoting flaps towards the exterior in order to deviate the secondary flow towards the front. The interior and exterior flaps connect together with the front and rear portions of the nacelle, but these connections reduce the aerodynamism of the nacelle. Moreover, they do not make an effective acoustic treatment possible. Joints being generally provided on these connections in order to avoid leaks of secondary flow in folded position of the flaps, which further amplifies the disadvantages mentioned hereinabove.

Nacelles are also known comprising a fixed front portion and a rear longitudinally mobile portion towards the rear, in order to arrange between the fixed portion and the mobile portion a radial opening, as well as flaps provided in the secondary duct, articulated in relation to the mobile portion, able to occupy a first deployed position wherein they seal at least partially the secondary duct, in such a way as to deviate the flow of air in the direction of the radial opening, and a second folded position, thrust against the surface of the nacelle. Rods are provided in order to operate the flaps, one of the ends of the rods being linked to the flap, the other to the motorisation.

As mentioned hereinabove, these configurations limit the application of a coating for acoustic treatment of the internal surface of the nacelle due to the presence of the flaps. Indeed, the connection zones between the fixed portion and the mobile portion and the zones on which are provided the articulations of the pivoting elements (doors or flaps) cannot include a coating for acoustic treatment. These untreated surfaces can represent about 20% of the internal surface of the nacelle.

These configurations also generate aerodynamic losses on flux flowing in the secondary duct due to the numerous spacings and misalignments due to the presence of flaps, and also due to the presence of rods in the secondary channel.

Furthermore, it is necessary to clear the space located to the rear of the mobile portions in order to accommodate their travel, which can reach one metre, and this in order to avoid the interferences with the slats and the distance to the wing.

Furthermore, an overload is applied to the internal acoustic panel forming the radially internal wall of the secondary channel during the actuating of the thrust reverser, due to the traction applied by the rods on the internal acoustic panel to open the flaps.

This invention thus has for purpose to offer a simple and robust nacelle of which the aerodynamic performance and the acoustical qualities are improved in relation to nacelles of prior art.

DESCRIPTION OF THE INVENTION

The previously announced purpose is achieved by a nacelle comprising a fixed front portion, a rear mobile portion, and flaps able to deploy inside the nacelle in the secondary duct, the mobile portion comprising an annular recess to receive its flaps in folded position, the sliding of the mobile portion provoking a deploying of the flaps in the secondary duct, the deploying and the returning taking place without control of added actuators, the flaps being mounted rotatably mobile on the mobile portion and at least one sliding-pivot joint being provided between each flap and the mobile portion.

In other terms, the flaps are deployed solely by cooperation with the fixed portion and the mobile portion by means of mechanical connections forming means for opening automatically on each flap, these means being controlled directly by the displacement of the mobile portion.

This invention has the advantage of isolating the flaps of the secondary channel in normal operation, i.e. without reversal of the thrust, reducing the misalignments and making it possible to apply a quasi-continuous acoustic treatment on the radially exterior wall of the secondary channel. Furthermore the invention is very robust as it implements only mechanical means and does not require any electrical, hydraulic or pneumatic actuator other than those required to slide the rear mobile portion of the nacelle.

This subject-matter of the present invention is thus an aircraft nacelle comprising a cowling of longitudinal axis, an engine housed in an interior space delimited by the cowling, an annular channel surrounding the engine and intended to receive a secondary flow, the cowling comprising a fixed portion and a mobile portion able to slide according to an axis substantially parallel to the longitudinal axis in order to define a radial opening between the mobile portion and the fixed portion, a thrust reverser system comprising a plurality of interior flaps mounted rotatably mobile able to have a rest position, wherein the interior flaps are substantially parallel to the longitudinal axis and a deployed position wherein the interior flaps obstruct at least partially the annular channel, characterised in that the mobile portion of the cowling comprises an annular housing centred on the longitudinal axis, and extending longitudinally to receive the interior flaps in rest position, and in that each flap is linked to the fixed portion by at least one pivot joint axis orthogonal to the longitudinal axis and is linked to the mobile portion by at least one sliding-pivot joint, of which the axis of the pivot is substantially parallel to the axis of the pivot joint linking the flap to the fixed portion, and the axis of the sliding joint is orthogonal to the axis of the pivot and is contained in a plane substantially parallel to a plane containing the longitudinal axis, in such a way that a sliding of the mobile portion by separation from the fixed portion provokes a rotation of each flap around the axis of rotation of the joint with the fixed portion, in such a way that the control of the position of the flaps is obtained directly by sliding the mobile portion of the cowling.

In an embodiment, the pivot joint between each flap and the fixed portion is accomplished by an axis crossing longitudinal ends of two longitudinal bars fixed to the fixed portion laterally surrounding a first longitudinal end of the flap, and the flap.

Each longitudinal bar participates advantageously in the articulation of two flaps, which makes it possible to reduce the number of components.

The sliding-pivot joint between each flap and the mobile portion is, for example accomplished by a carriage mounted rotatably mobile on a radially internal wall of the annular housing or on the flap, and able to slide in a sliding rail formed in a face of the flap facing said radially internal wall of the annular housing or in a sliding rail formed in the radially internal wall respectively.

In another embodiment, the pivot joint between each flap and the fixed portion is accomplished by two rods connected rotatably mobile on the fixed portion and on the flap.

Advantageously, the joint between each rod and the fixed portion is a ball-joint connection and/or the joint between each rod and the flap is a sliding-pivot joint and wherein the flap is connected by two annular linear joints to the mobile portion.

Each rod participates advantageously in the articulation of two flaps.

The first annular linear joint between each flap and the mobile portion is, for example accomplished by a carriage mounted rotatably mobile on a radially internal wall of the annular housing or on the flap, and able to slide in a sliding rail formed in a face across from the flap or in a sliding rail formed in the radially internal wall respectively, and the second sliding annular joint between each flap and the mobile portion is, for example accomplished by a carriage mounted rotatably mobile on a first longitudinal end of the flap or on a radially external wall of the annular housing, and able to slide in a sliding rail formed in a radially external wall of the annular housing or in a sliding rail formed in a face of the flap facing said radially external wall of the annular housing respectively.

All of the system connected to the radially external wall of the annular housing can be advantageously control by the adding of a system controlling the rotation of the linear annular joint accomplished on the radially internal wall of the annular housing, for example a circular spring can be used advantageously.

This invention also has for purpose an aircraft comprising at least one nacelle according to this invention.

BRIEF DESCRIPTION OF THE DRAWINGS

This invention shall be better understood using the following description and the annexed drawings wherein.

DETAILED DESCRIPTION OF PARTICULAR EMBODIMENTS

Figure 1:
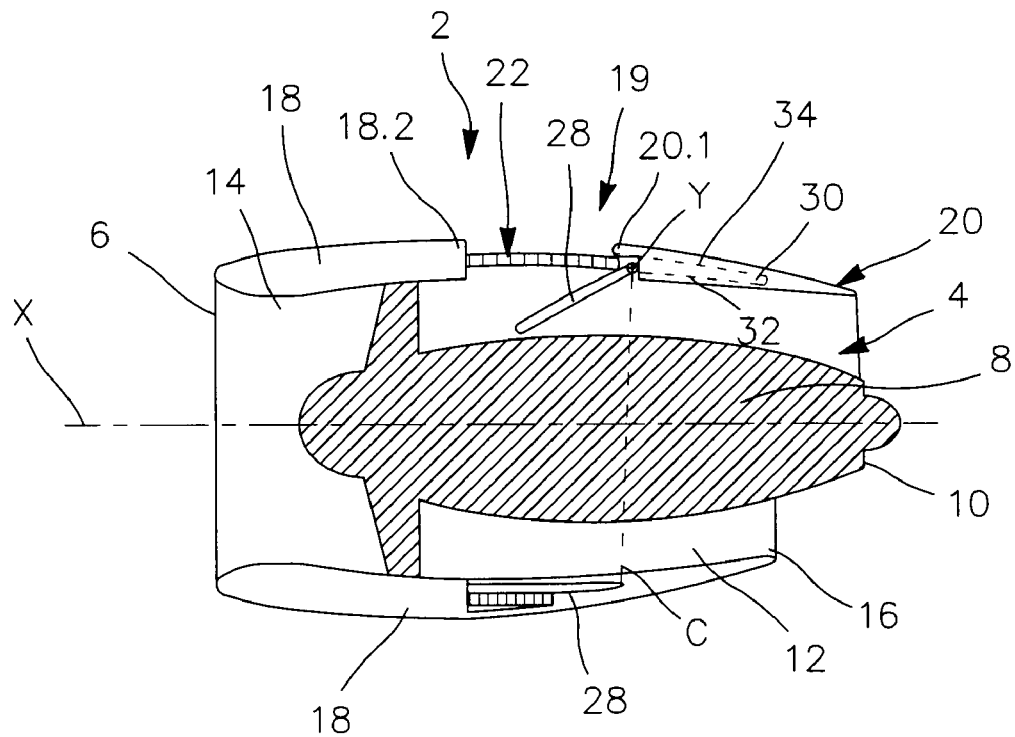
FIG. 1 is a general schematic longitudinal section view of a nacelle according to this invention.
Figure 2:
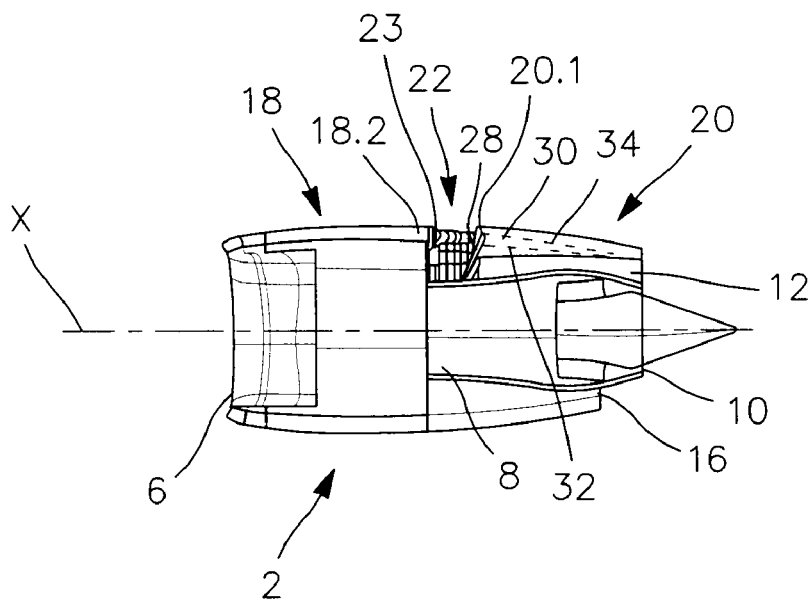
FIG. 2 is a longitudinal section view of a nacelle according to a first embodiment of this invention, with the thrust reverser deployed.

In FIG. 1, a schematic section view can be seen of an aircraft nacelle 2 according to this invention of longitudinal axis X, wherein is arranged a motorisation 4.

The nacelle 2 comprises in the front an air inlet 6 which is divided into a primary duct 8 crossing the motorisation 4 and exiting via a primary outlet 10 at the rear of the nacelle 2, and in a secondary duct 12 provided at the rear of a fan 14 exiting via a secondary outlet 16. As such, the thrust of the propulsion unit formed by the nacelle and the motorisation stems in particular from the ejection of the fluid flows exiting from the primary and secondary outlets 10 and 16.

The nacelle 2 is intended to be fixed under an aircraft wing by means of a pylon extending axially under the wing, and connecting to the nacelle on an upper zone. For example, the pylon crosses the cowling of the nacelle and connects to the motorisation 4. In another configuration, the nacelle 2 is fixed to the fuselage by means of a longitudinal structure.

The nacelle comprises a thrust reverser system 19. In this application, system thrust reverser means a system able to reduce, cancel or reverse the thrust.

The nacelle 2 comprises a fixed portion 18 and a mobile portion 20. In the example shown, the fixed portion 18 forms the front portion of the cowling of the nacelle, and the mobile portion 20 forms the rear portion of the cowling of the nacelle.

In this application, the front and the rear are defined in relation to the X axis, the front of the nacelle being the end located towards the front of the aircraft on the cockpit side, and the rear being the end located to the rear of the aircraft of the side of its tail.

The mobile portion 20 is able to be displaced axially towards the rear over a limited travel on an axis substantially parallel to the X axis, in such a way that a front end 20.1 of the mobile portion 20 arranges with a rear end 18.2 a radial opening 22 of substantially annular form, when the mobile portion 20 is in retracted position. This radial opening 22 forms a part of the thrust reverser system 19.

The mobile portion 20 is, for example displaced by means of actuators well known to those skilled in the art, and as such they will not be described in detail.

This radial opening 22 exits into the secondary duct 12, in order to allow the secondary flow flowing in the secondary duct 12 to escape at least partially via this radial opening 22.

In order to increase the effectiveness of the system, winglets 23 can advantageously be added in the radial opening 22, the latter are inclined towards the front in such a way as to form deflectors of the secondary flow. These winglets offer an exterior profile such that it penetrates into the radial housing 30 or into the fixed portion 18 when the mobile portion 20 is in advanced position.

The thrust reverser system 19 also comprises elements 28 able to penetrate into the secondary duct in order to reduce or interrupt the secondary flow exiting towards the rear end of the nacelle, reducing or cancelling respectively the thrust generated by the secondary flow.

The elements 28 are formed by a plurality of flaps 28 able to move between a folded position substantially tangent to an imaginary circle C of axis X and a deployed position towards the interior and penetrating into the secondary duct 12.

Each flap 28 is mounted rotatably mobile around an axis Y tangent to the imaginary circle C. The flaps are distributed across the entire periphery of the disc C in such a way as to completely or partially seal the secondary duct 12 when they are fully deployed.

According to this invention, the mobile portion 20 of cylindrical form comprises an axial annular housing 30 delimited between an inner sleeve 32 and an outer sleeve 34. The inner sleeve 32 forms the radially exterior wall of the secondary duct, and the outer sleeve forms the exterior wall of the nacelle.

According to this invention, the flaps 28 are in folded position received in the annular housing 30, as such the flaps and the connection zones between the flaps are concealed in the mobile portion 20 and thus do not delimit the secondary duct, and the radially exterior surface of the secondary duct 22 is free from any alignment and can receive a total acoustic treatment.

Each flap 28 has, in the example shown substantially a form of a trapezium mounted pivoting on the large base of the trapezium in such a way that when the flaps are deployed, it forms a continuous or partial crown with the possibility of overlapping.

The flaps can have varied forms and geometries. The forms and geometries can be optimised by structural, aerodynamic or acoustic considerations.

The flaps can also have a rectangular form, overlapping in rest state.

In the FIGS. 2 to 5D, a first embodiment can be seen of a nacelle according to this invention.

According to this first embodiment, the flaps 28 are mounted rotatably mobile on the fixed portion 18. As such each flap is linked to the fixed portion by a pivot joint 36 of axis Y orthogonal to the longitudinal axis X.

Figure 3:
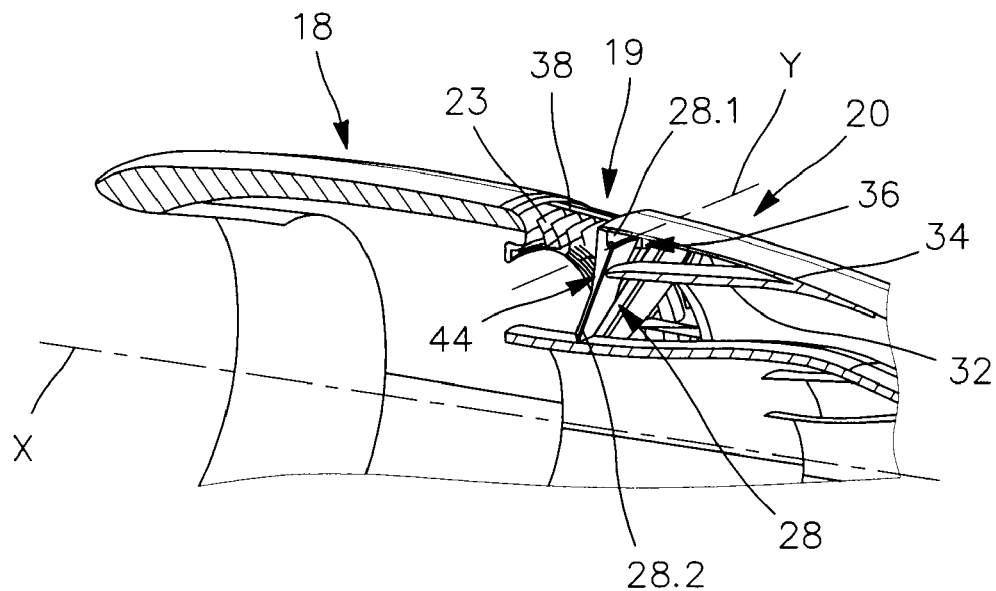
FIG. 3 is a perspective view of the demi-nacelle in FIG. 2, on which a single flap is shown in deployed position.
Figure 4:
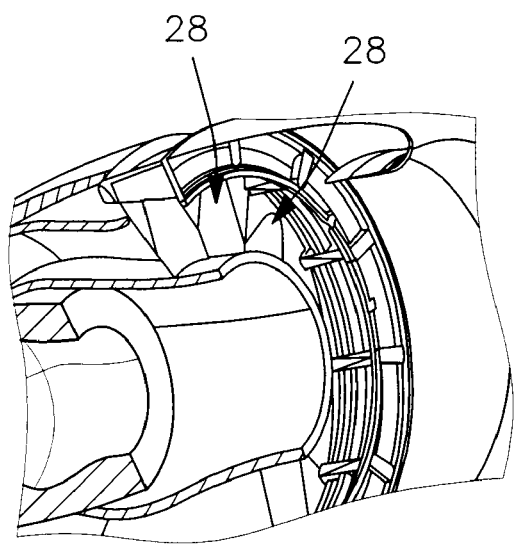
FIG. 4 is a perspective view of the nacelle of the first embodiment viewed from the front, several flaps being shown in deployed position.

In FIG. 3, only one flap 28 is deployed position is shown for the purposes of clarity. In FIG. 4, a longitudinal section view can be seen of the nacelle according to the first embodiment, in which a plurality of flaps is shown.

In the first embodiment, longitudinal bars 38 are distributed regularly across the periphery of the ring formed by the winglets 23. Each flap is linked to one or several bars 38 by a pivot joint. An example of the first embodiment consists in that the flap 28 is arranged between two bars 38 and an axis 42 crosses the rear ends of the bars 38 and the first longitudinal end 28.1, transversally in order to provide the pivot joint between the flap 28 and the fixed portion 18. The axis 42 has a direction Y orthogonal to the longitudinal axis X.

The bars 38 are fixed in relation to the fixed portion 18.

Advantageously, each bar 38 participates in the articulation of two flaps 28. As such, if the thrust reversing means comprise n flaps (n being a natural number), n-1 bars 38 are required, which makes it possible to reduce the mass of the unit. In this case, one of the ends of the edge flaps is also directly articulated on the frame of the fixed structure.

Each flap 28 is furthermore linked to the mobile portion 20 by a sliding-pivot joint 44.

More particularly, this sliding-pivot joint 44 is accomplished between the inner sleeve 32 of the mobile portion 20 and each flap 28.

In the example shown in the FIGS. 5A to 5D, each flap 28 comprises a longitudinal sliding rail 46 made in the face of the flap across from the inner sleeve 32 receiving by sliding a carriage 39. The carriage 39 is mounted rotatably mobile on the inner sleeve 32 on its front end 38.1 by means of an annular linear joint of axis 41.

Advantageously, this sliding rail is made substantially in the central part of the flap, i.e. in a plane orthogonal to the flap and containing the X axis in order to provide a good distribution of the efforts.

The carriage can slide in the sliding rail 46, allowing the flap 28 to slide in relation to the mobile portion 20 and to pivot in relation to the latter.

The axis Y1 of the pivot is parallel to the axis Y of the pivot joint between the flap 28 and the fixed portion 18.

The axis of the sliding rail joint is orthogonal to the axis Y1 of the pivot and is contained in a plane parallel to a plane containing the longitudinal axis X.

It is of course understood that the sliding-pivot joint 44 can be accomplished in another manner, for example the sliding rail in the mobile portion and the carriage on the flap can be provided; lateral sliding rails in the flaps and two transversal pins on the mobile portion can also be provided.

We shall now describe the deploying of the means for reversing thrust according to this invention in reference with FIGS. 5A to 5D.

Figure 5A:
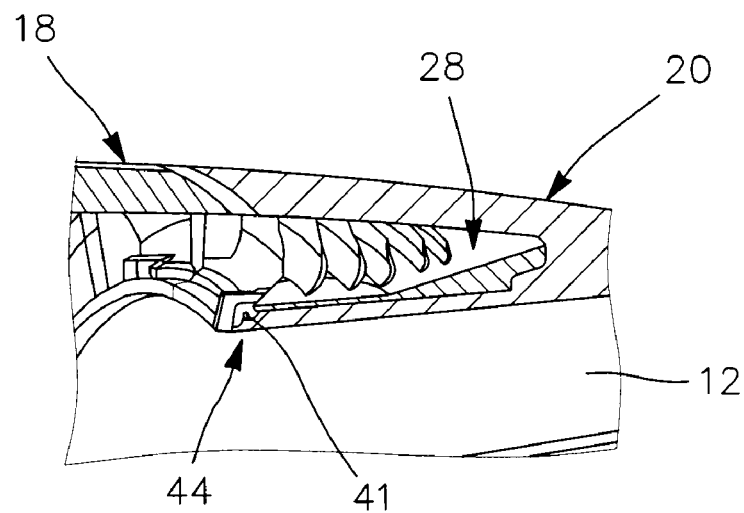
FIG. 5A to 5D are detailed views of the nacelle according to the first embodiment of this invention representing different positions of the thrust reverser, between an inactive position of the thrust reverser towards an active position.

In inactive position such as is shown in FIG. 5A, the flaps 28 are substantially parallel to the X axis and contained in the annular housing 30 defined in the mobile portion 20.

The radially external wall of the secondary channel is thus formed by the internal sleeve 32 of the mobile portion 20, the misalignments are therefore reduced.

Figure 5B:
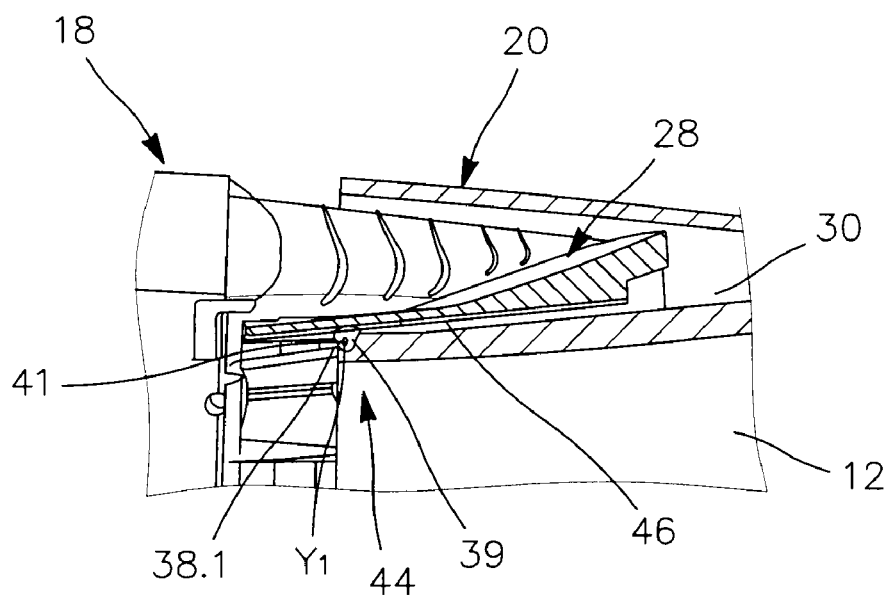
Figure 5C:
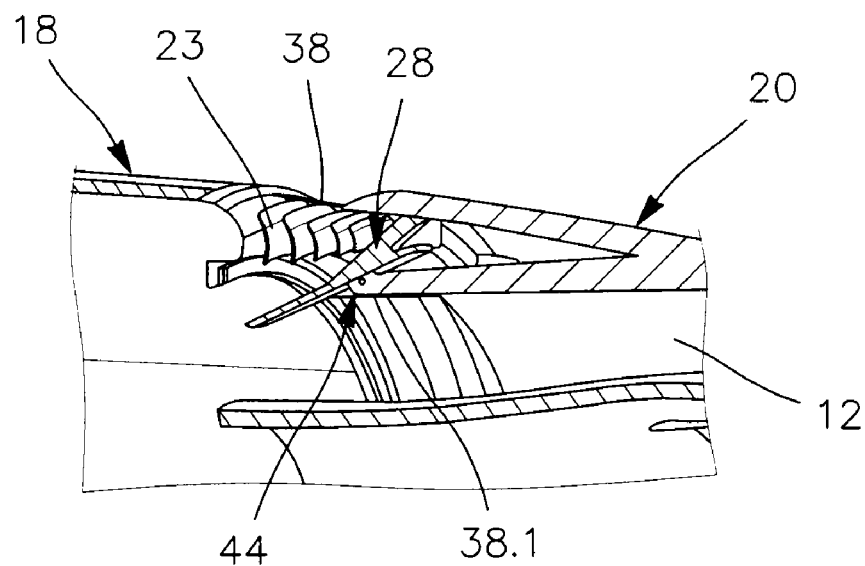

When a reversal of the thrust is required, for example during a landing, a control provokes the actuating of the actuators provoking the sliding of the mobile portion along the X axis by separating from the fixed portion (FIG. 5B).

Figure 5D:
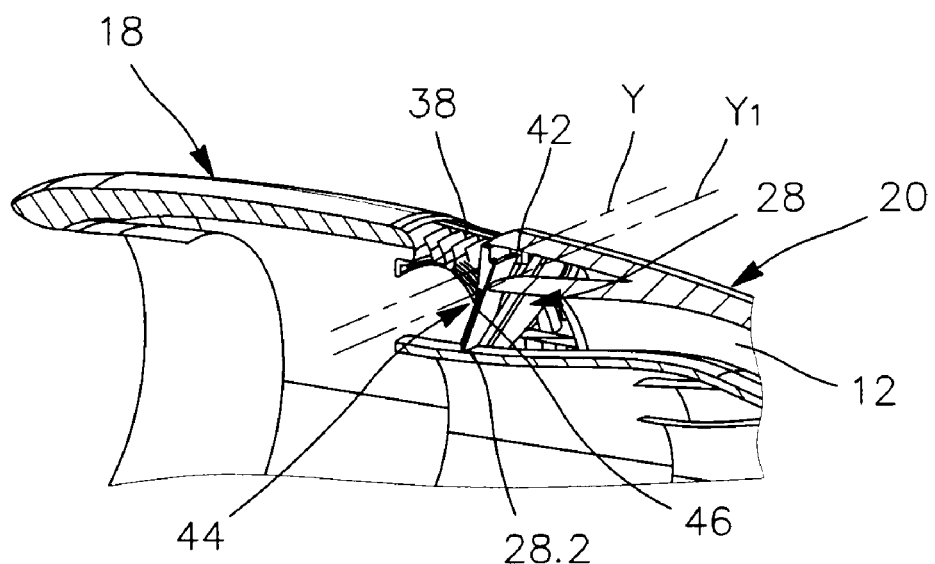
Figure 6:
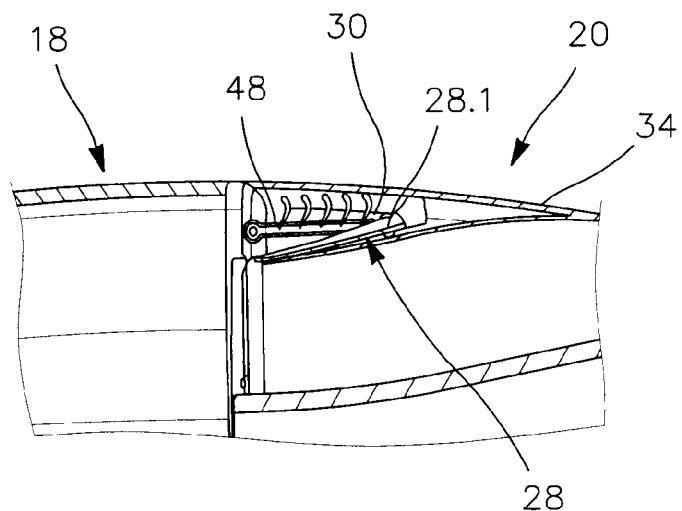
FIG. 6 is a longitudinal section view of a nacelle according to a second embodiment of this invention, with the thrust reverser in inactive position.
Figure 7:
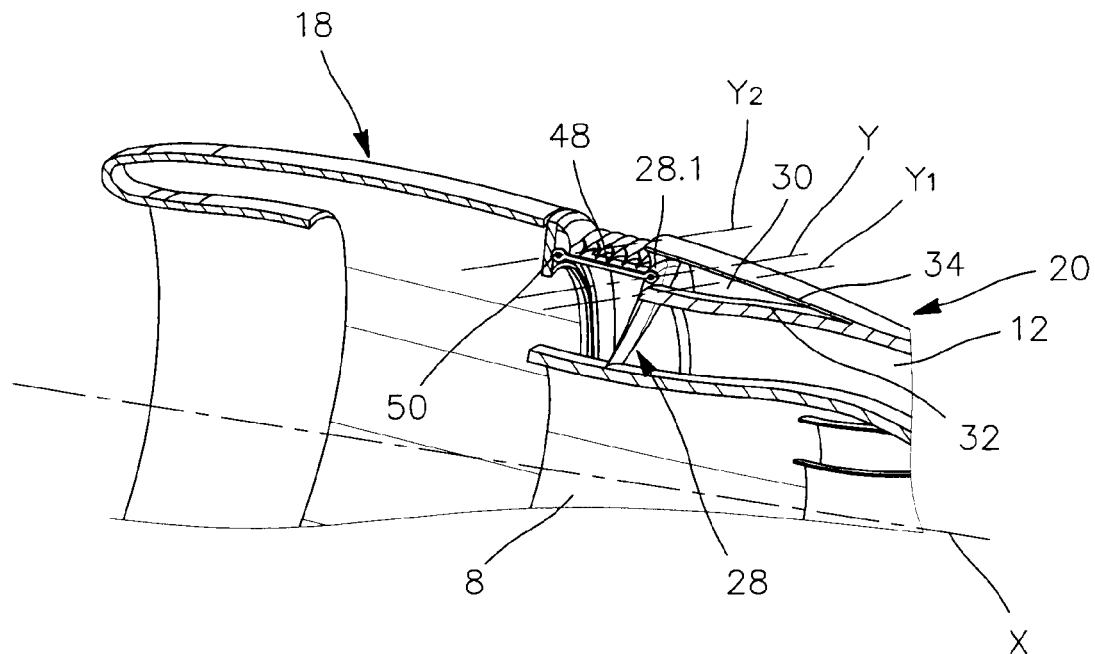
FIG. 7 is a perspective view of the demi-nacelle of FIG. 6 on which a single flap is shown in deployed position.

The sliding of the mobile portion pulls on the flaps on the sliding-pivot joint 44, the carriages 39 slide in their respective sliding rail 46 (FIG. 5C) and the flaps pivot in relation to the fixed portion towards the interior of the secondary channel 12, which closes the secondary channel and provokes a deviation of the secondary flow towards the exterior. The winglets 23 and the flaps 28 provoke a correction of the secondary flow towards the front, and a reversal of the thrust is exerted towards the front, braking the aircraft (FIG. 5D).

The dimensions of the nacelle, in particular the longitudinal dimension of the flaps, are chosen in such a way that the second front end 28.2 of the flaps comes to reduce the play with the radially internal wall of the secondary channel, thus maximising the closing of the secondary channel.

Advantageously, the end of the flaps 28 coming into contact with the outer sleeve 34 has a curved form that is complementary to the outer sleeve 34 in order to provide a maximum closing.

In the FIGS. 6 to 9F, another embodiment of a nacelle can be seen according to this invention. This embodiment differs from the embodiment shown in the FIGS. 2 to 5D, in that the flaps are no longer maintained radially by the fixed portion, but by the mobile portion 20.

Figure 8A:
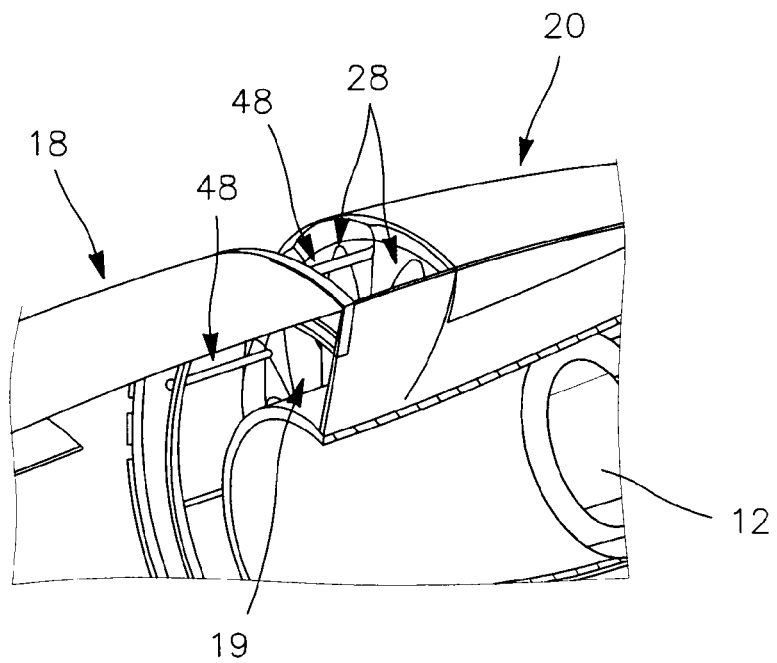
FIGS. 8A to 8D are detailed views of FIG. 7 under different angles of view, with the flap(s) in deployed position.
Figure 8B:
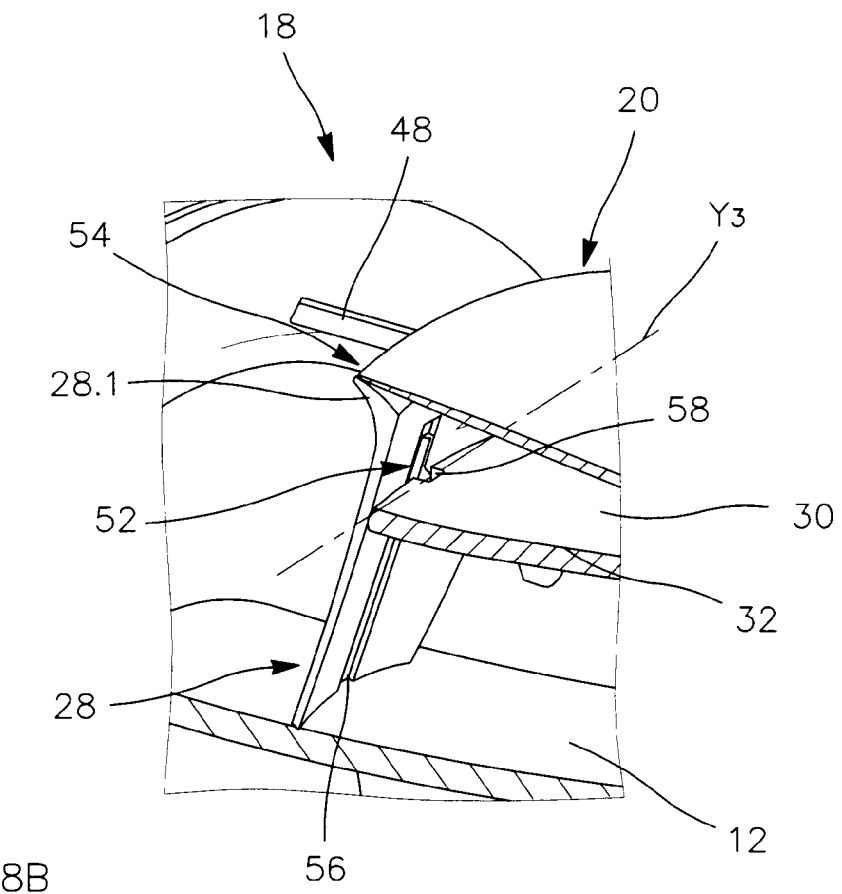
Figure 8C:
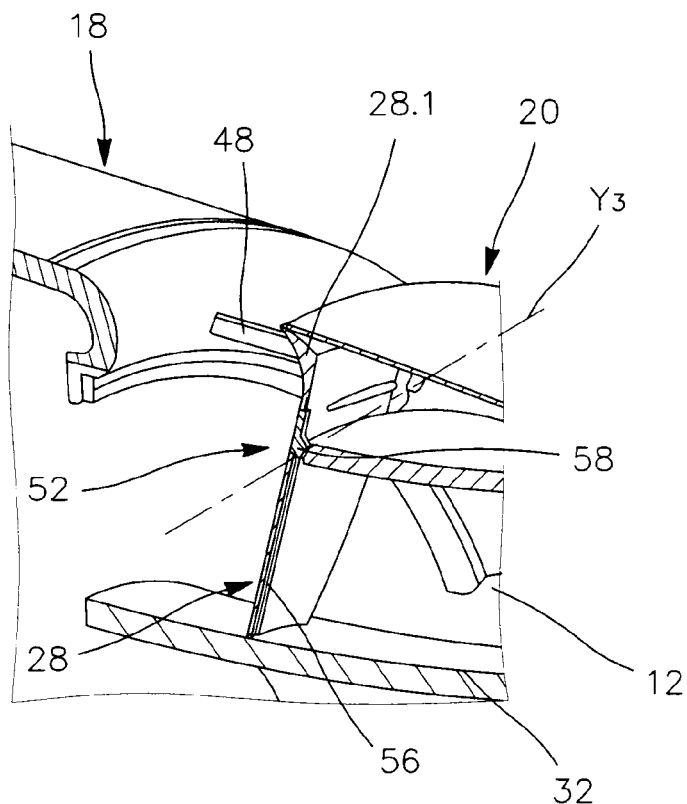
Figure 8D:
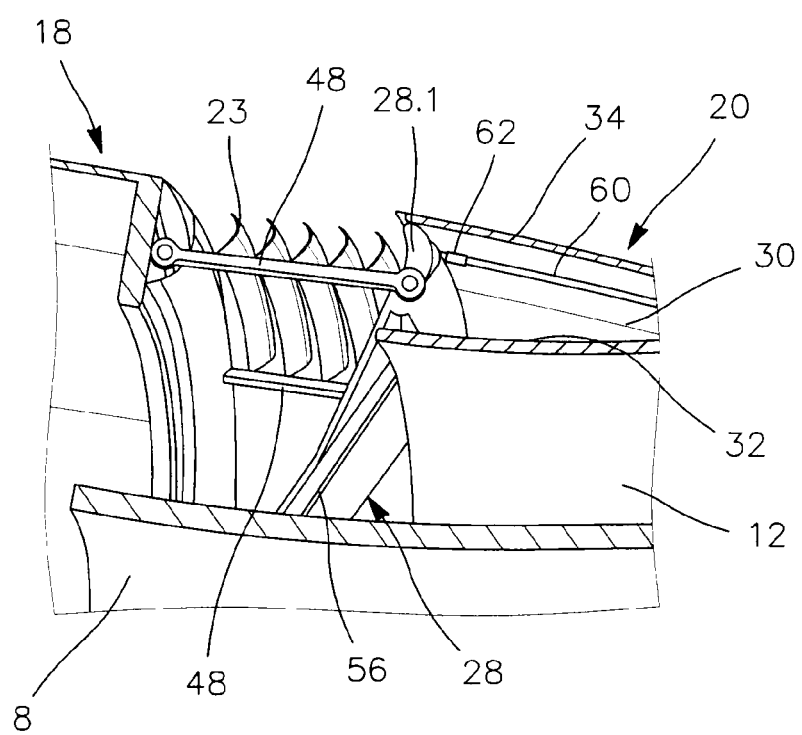

In FIG. 8A, a plurality of flaps in closed position is shown, while in the FIGS. 8B to 8D, a single flap is shown for the purposes of clarity. In FIG. 8B, only approximately three-quarters of the flap are shown, and in FIG. 8C, only half of the flap is shown, however the contour of the flap is shown as a dashed line.

Each flap 28 is linked to the fixed portion 18 by two rods 48 (FIG. 8D), the latter being linked to the two lateral ends of the first longitudinal end 28.1 of the flap 28, these two ends defining the axis Y of rotation of the flap 28.

Advantageously, a ball-joint connection 50 is provided between the rods 48 and the fixed portion 18 in order to form an isostatic system, however it can be considered to provide only one pivot joint of axis Y2 orthogonal to the X axis.

Play is advantageously provided on the pivot joint between the rods 48 and the flap 28 according to the axis of the pivot, as such forming a sliding-pivot joint.

Advantageously, as can be seen in FIG. 8A, each rod 48 is shared between two adjacent flaps, which makes it possible to reduce the number of components in the nacelle, and therefore to reduce the mass of the nacelle. As such, for n flaps forming the thrust reversing means, n−1 rods are required; n is a whole number.

The flap 28 is moreover linked to the mobile portion 20 by a first 52 and a second 54 joint, of the annular linear type 54.

The first annular linear joint 52 is accomplished between the inner sleeve 32 of the mobile portion 20 and the flap 28.

In the example shown and such as is particularly visible in the FIGS. 8B and 8C, each flap 28 therefore comprises a central longitudinal sliding rail 56 accomplished in the face of the flap 28 across from the inner sleeve 32, and wherein slides a carriage 58 linked in rotation on the inner sleeve 32.

The axis Y1 of the pivot is parallel to the axis Y2 of the pivot joint between the flap 28 and the fixed portion 18.

The axis of the joint sliding rail is orthogonal to the axis Y1 of the pivot and is contained in a plane parallel to a plane containing the longitudinal axis X.

The second annular linear joint 54 is provided between the first longitudinal end 28.1 of the flap and the outer sleeve 34 of the mobile portion 20. This joint can be accomplished in different ways, for example a joint similar to the first annular linear joint can be provided, a sliding rail 60 being provided in the face of the outer sleeve across from the flap 28 receiving a carriage 62 mounted rotatably mobile on the first longitudinal end 28.1 of the flap (FIG. 8D). Other embodiments of the joint 54 are possible by using for example bearings.

We are now going to explain the operation of these means of reversing according to the second embodiment.

Figure 9A:
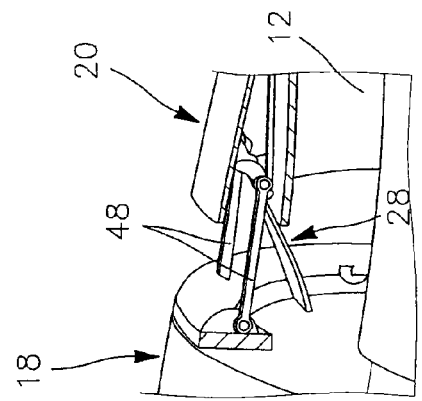
FIGS. 9A to 9F are detailed views of the nacelle according to the second embodiment of this invention representing different positions of the thrust reverser, between an inactive position of the thrust reverser towards an active position.

In inactive position such as is shown in FIG. 9A, the flaps 28 are substantially parallel to the X axis and contained in the annular housing 30 defined in the mobile portion 20.

The radially external wall of the secondary duct 12 is thus formed by the internal sleeve of the mobile portion 20, the misalignments are therefore reduced.

Figure 9B:
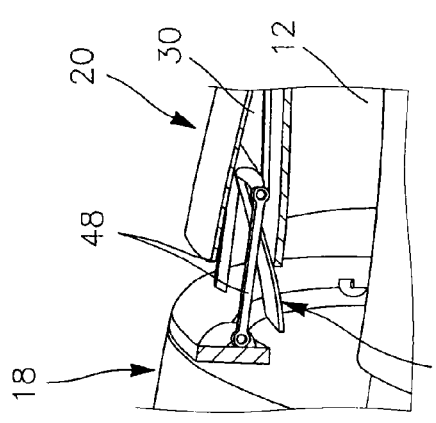
Figure 9C:
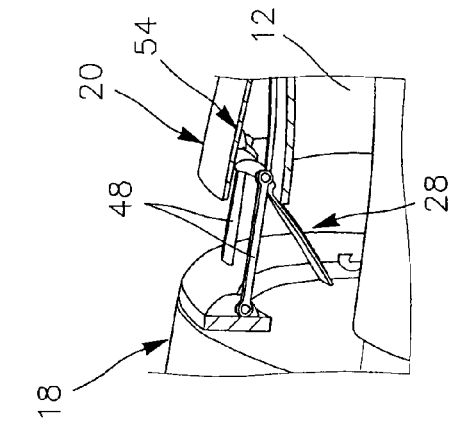
Figure 9D:
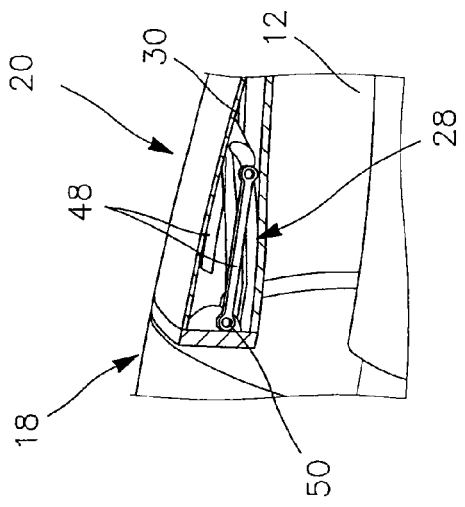
Figure 9E:
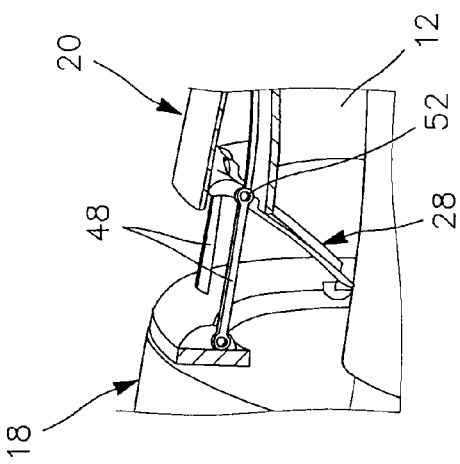
Figure 9F:
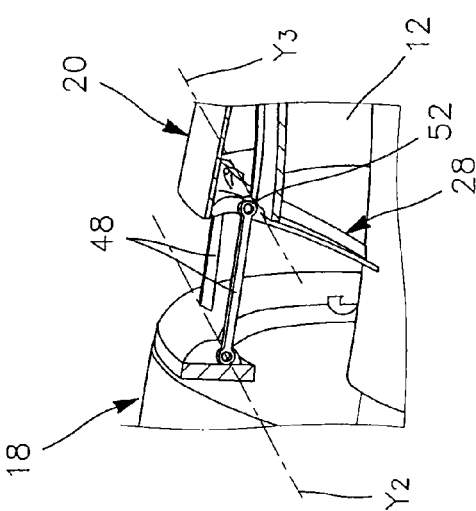

When a reversal of the thrust is required, for example during a landing, a control provokes the actuating of the actuators; provoking the sliding of the mobile portion along the X axis separating from the fixed portion 18 (FIG. 9B).

The sliding of the mobile portion 20 provokes an effort of traction on the flaps 28 on the first annular linear joint 52, the flaps are simultaneously guided by the second annular linear joint 54 with the outer sleeve. Due to the pivot joint between the flaps 28 and the fixed portion 18, the flaps 28 pivot towards the interior of the secondary channel (FIG. 9C to 9F), until the secondary channel is closed (FIG. 9F and FIG. 8A with several flaps) and provokes a deviation of the secondary flow towards the exterior. The winglets 23 and the flaps 28 provoke a correction of the secondary flow and a reversal of the thrust and an exertion towards the front takes place, braking the aircraft.

As in the first embodiment, the dimensions of the nacelle, in particular the longitudinal dimension of the flaps, are chosen in such as way that the second front end 28.2 of the flaps comes to reduce the play with the radially internal wall of the secondary channel, maximising as such the closing of the secondary channel.

It is of course understood that the flaps 28 are not necessarily fully deployed in order to fully seal the secondary duct 12, they can be deployed in such a way as to only partially seal the secondary duct 12.

This invention makes it possible to suppress the misalignments in the secondary channel and on the exterior surface of the nacelle as well, which makes it possible to improve the aerodynamic performance and to accomplish an affective acoustic treatment. Furthermore, it allows for a simple and robust actuating of the means for reversing thrust. Indeed, only the sliding of the mobile portion requires means of controlling and of actuating of the hydraulic, pneumatic or electrical type, with the switching of the flaps taking place thanks to a mechanical arrangement in a particular complex control.

The invention claimed is:

1. Aircraft nacelle comprising:
   a cowling of longitudinal axis,
   an engine housed in an interior space delimited by the cowling,
   an annular channel surrounding the engine and intended to receive a secondary flow,
   the cowling comprising:
   a fixed portion,
   a mobile portion able to slide according to an axis substantially parallel to the longitudinal axis in order to define a radial opening between the mobile portion and the fixed portion,
   a thrust reverser system comprising a plurality of interior flaps mounted rotatably mobile and able to have a rest position, wherein the interior flaps are substantially parallel to the longitudinal axis, and able to have a deployed position wherein the interior flaps obstruct at least partially the annular channel, the mobile portion of the cowling comprising an annular housing centred on the longitudinal axis, and extending longitudinally in order to receive the interior flaps in the rest position,
   each flap of the thrust reverser being linked to the fixed portion by at least one pivot joint of axis orthogonal to the longitudinal axis, said pivot joint being accomplished by an axis crossing longitudinal ends of two longitudinal bars fixed to the fixed portion surrounding laterally a first longitudinal end of the flap, and the flap,
   each flap being also linked to the mobile portion by at least one sliding-pivot joint including a sliding pivot and a sliding rail, the axis of the sliding pivot being substantially parallel to the axis of the pivot joint linking the flap to the fixed portion, and the axis of the sliding rail being orthogonal to the axis of the pivot joint and being contained in a plane substantially parallel to a plane containing the longitudinal axis, in such a way that a sliding of the mobile portion in separation from the fixed portion provokes a rotation of each flap around the axis of rotation of the pivot joint with the fixed portion, the control of the position of the flaps being obtained as such directly by sliding of the mobile portion of the cowling.

2. Nacelle set forth in claim 1, wherein each longitudinal bar participates in the articulation of two flaps.

3. Nacelle set forth in claim 1, wherein the two longitudinal bars are fixed in relation to the fixed portion.

4. Nacelle set forth in claim 1, wherein the sliding-pivot joint between each flap and the mobile portion is accomplished by a carriage mounted rotatably mobile on a radially internal wall of the annular housing, and able to slide in the sliding rail, which is formed in a face of the flap facing said radially internal wall of the annular housing.

5. Nacelle set forth in claim 1, wherein the sliding-pivot joint between each flap and the mobile portion is accomplished by a carriage mounted rotatably mobile on the flap, and able to slide in the sliding rail, which is formed in the radially internal wall.

6. Nacelle set forth in claim 1, wherein the two longitudinal bars are two rods connected rotatably mobile on the fixed portion and on the flap.

7. Nacelle as claimed in the claim 6, wherein a joint between each rod and the fixed portion is a ball-joint connection and a joint between each rod and the flap is a sliding-pivot joint, and wherein the flap is linked by first and second annular linear joints to the mobile portion.

8. Nacelle set forth in claim 7, wherein the first annular linear joint between each flap and the mobile portion is accomplished by a carriage mounted rotatably mobile on a radially internal wall of the annular housing and able to slide in a second sliding rail formed in a face of the flap facing said radially internal wall of the annular housing the flap, and the second annular linear joint between each flap and the mobile portion is accomplished by a carriage mounted rotatably mobile on a first longitudinal end of the flap and able to slide in a third sliding rail formed in a radially external wall of the annular housing.

9. Nacelle set forth in claim 7, wherein the first annular linear joint between each flap and the mobile portion is accomplished by a carriage mounted rotatably mobile on the flap and able to slide in a second sliding rail formed in the radially internal wall, and the second annular linear joint between each flap and the mobile portion is accomplished by a carriage mounted rotatably mobile on a first longitudinal end of the flap and able to slide in a third sliding rail formed in a radially external wall of the annular housing.

10. Nacelle set forth in claim 7, wherein the first annular linear joint between each flap and the mobile portion is accomplished by a carriage mounted rotatably mobile on the flap and able to slide in a second sliding rail formed in the radially internal wall, and the second annular linear joint between each flap and the mobile portion is accomplished by a carriage mounted rotatably mobile on a radially external wall of the annular housing and able to slide in a third sliding rail formed in a face of the flap facing said radially external wall of the annular housing.

11. Nacelle set forth in claim 7, wherein the first annular linear joint between each flap and the mobile portion is accomplished by a carriage mounted rotatably mobile on a radially internal wall of the annular housing and able to slide in a second sliding rail formed in a face facing said radially internal wall of the annular housing the flap, and the second annular linear joint between each flap and the mobile portion is accomplished by a carriage mounted rotatably mobile on a radially external wall of the annular housing and able to slide in a third sliding rail formed in a face of the flap facing said radially external wall of the annular housing.

12. Nacelle set forth in claim 6, wherein a joint between each rod and the fixed portion is a ball-joint connection and a joint between each rod and the flap is a sliding-pivot joint, and wherein the flap is linked by an annular linear joint to the radially internal wall of the annular housing of the mobile portion, said nacelle comprising a system controlling the rotation of the annular linear joint.

13. Aircraft comprising at least one nacelle comprising:
a cowling of longitudinal axis,
an engine housed in an interior space delimited by the cowling,
an annular channel surrounding the engine and intended to receive a secondary flow,
the cowling comprising:
a fixed portion,
a mobile portion able to slide according to an axis substantially parallel to the longitudinal axis in order to define a radial opening between the mobile portion and the fixed portion,
a thrust reverser system comprising a plurality of interior flaps mounted rotatably mobile and able to have a rest position, wherein the interior flaps are substantially parallel to the longitudinal axis, and able to have a deployed position wherein the interior flaps obstruct at least partially the annular channel, the mobile portion of the cowling comprising an annular housing centred on the longitudinal axis, and extending longitudinally in order to receive the interior flaps in the rest position,
each flap of the thrust reverser being linked to the fixed portion by at least one pivot joint of axis orthogonal to the longitudinal axis, said pivot joint being accomplished by an axis crossing longitudinal ends of two longitudinal bars fixed to the fixed portion surrounding laterally a first longitudinal end of the flap, and the flap,
each flap being also linked to the mobile portion by at least one sliding-pivot joint including a sliding pivot and a sliding rail, the axis of the sliding pivot being substantially parallel to the axis of the pivot joint linking the flap to the fixed portion, and the axis of the sliding rail being orthogonal to the axis of the pivot joint and being contained in a plane substantially parallel to a plane containing the longitudinal axis, in such a way that a sliding of the mobile portion in separation from the fixed portion provokes a rotation of each flap around the axis of rotation of the pivot joint with the fixed portion, the control of the position of the flaps being obtained as such directly by sliding of the mobile portion of the cowling.

14. Nacelle set forth in claim 12, wherein the system is formed by a circular spring.

\* \* \* \* \*